(12) United States Patent
Karunaratne

(10) Patent No.: US 9,163,152 B2
(45) Date of Patent: Oct. 20, 2015

(54) UV PHOTOACTIVATABLE CURABLE PAINT FORMULATIONS AND CURED COATINGS THEREOF

(75) Inventor: Nirupama Karunaratne, Alliston (CA)

(73) Assignee: Honda Motor Co., Ltd. (JP)

( * ) Notice: Subject to any disclaimer, the term of this patent is extended or adjusted under 35 U.S.C. 154(b) by 742 days.

(21) Appl. No.: 13/381,828

(22) PCT Filed: Jun. 29, 2010

(86) PCT No.: PCT/CA2010/001035
§ 371 (c)(1),
(2), (4) Date: Dec. 30, 2011

(87) PCT Pub. No.: WO2011/000111
PCT Pub. Date: Jan. 6, 2011

(65) Prior Publication Data
US 2012/0107523 A1    May 3, 2012

(30) Foreign Application Priority Data
Jun. 30, 2009    (CA) .................................... 2672413

(51) Int. Cl.
*C09D 7/12* (2006.01)
*C09D 5/38* (2006.01)
*C09D 175/16* (2006.01)
*C08K 3/08* (2006.01)

(52) U.S. Cl.
CPC ............. *C09D 7/1291* (2013.01); *C09D 5/38* (2013.01); *C09D 175/16* (2013.01); *C08K 3/08* (2013.01)

(58) Field of Classification Search
CPC ...... C09D 7/1291; C09D 5/38; C09D 175/16; C08K 3/08
See application file for complete search history.

(56) References Cited

U.S. PATENT DOCUMENTS

| | | | |
|---|---|---|---|
| 3,766,095 A * | 10/1973 | Mastrangelo ................. | 252/513 |
| 4,844,947 A | 7/1989 | Kasner | |
| 5,250,228 A * | 10/1993 | Baigrie et al. ................ | 252/511 |
| 5,997,941 A | 12/1999 | Dannenhauer | |
| 6,248,804 B1 | 6/2001 | Lutz | |
| 6,257,297 B1 | 7/2001 | Chenetski | |
| 6,579,913 B2 | 6/2003 | Klinkenberg | |
| 6,617,589 B2 | 9/2003 | Ueno | |
| 6,696,802 B1 | 2/2004 | Lezcano et al. | |
| 6,794,442 B2 | 9/2004 | Colyer | |
| 6,838,177 B2 | 1/2005 | Fenn | |
| 6,867,244 B2 | 3/2005 | Klinkenberg | |
| 6,987,135 B2 | 1/2006 | Van Den Berg | |
| 6,997,980 B2 | 2/2006 | Wegner | |
| 7,175,712 B2 | 2/2007 | Siegel | |
| 7,372,530 B2 | 5/2008 | Stephenson | |
| 7,425,586 B2 | 9/2008 | Weine-Ramsey | |
| 7,488,518 B2 | 2/2009 | Ortlieb | |
| 7,498,362 B2 | 3/2009 | Ramsey | |
| 8,227,539 B2 | 7/2012 | Oyanagi et al. | |
| 8,636,307 B2 * | 1/2014 | Magnin et al. .................. | 283/90 |
| 2002/0132044 A1 | 9/2002 | Quarles | |
| 2003/0036604 A1 | 2/2003 | Meisenburg | |
| 2004/0013815 A1 * | 1/2004 | Gros ............................. | 427/558 |
| 2004/0116554 A1 * | 6/2004 | Karunaratne et al. ......... | 523/171 |
| 2004/0232358 A1 | 11/2004 | Moruzzi | |
| 2005/0133732 A1 | 6/2005 | Ohtomo | |
| 2005/0266235 A1 | 12/2005 | Nakajima | |
| 2006/0021537 A1 | 2/2006 | Ohtsu | |
| 2006/0100302 A1 | 5/2006 | Krohn | |
| 2006/0165882 A1 | 7/2006 | Stropp | |
| 2006/0205843 A1 | 9/2006 | Karunaratne | |
| 2006/0274421 A1 | 12/2006 | Okamitsu | |
| 2006/0292311 A1 | 12/2006 | Kilburn | |
| 2007/0116866 A1 | 5/2007 | Mich | |
| 2007/0191509 A1 | 8/2007 | Kobayashi | |
| 2007/0251420 A1 * | 11/2007 | Bolm et al. ............... | 106/287.17 |
| 2008/0032037 A1 * | 2/2008 | Frey et al. ......................... | 427/9 |
| 2008/0216706 A1 | 9/2008 | Ikeya et al. | |
| 2009/0022995 A1 * | 1/2009 | Graham et al. ............... | 428/409 |
| 2009/0045356 A1 | 2/2009 | Briggs et al. | |
| 2009/0188559 A1 * | 7/2009 | Nesbitt .......................... | 136/256 |
| 2009/0196160 A1 | 8/2009 | Crombach | |
| 2010/0076109 A1 * | 3/2010 | Kang et al. ....................... | 522/78 |
| 2011/0206858 A1 | 8/2011 | Loeffler et al. | |
| 2012/0094129 A1 * | 4/2012 | Temple ........................ | 428/413 |

FOREIGN PATENT DOCUMENTS

| | | |
|---|---|---|
| JP | H04293915 A | 10/1992 |
| JP | 05-305259 A | 11/1993 |
| JP | 5305259 A | 11/1993 |
| JP | H07256849 A | 10/1995 |
| JP | H07310033 A | 11/1995 |
| JP | 200273399 A | 10/2000 |
| JP | 2002212509 A | 7/2002 |
| JP | 2002270036 A | 9/2002 |
| JP | 2004099642 A | 4/2004 |
| JP | 2007326970 A | 12/2007 |

OTHER PUBLICATIONS

Friedman, J., Variability of Lamp Characteristics in Dental Curing Lights, Journal of Esthetic Dentistry, Nov./Dec. 1989, pp. 189-190, 1(6).

(Continued)

*Primary Examiner* — Sanza McClendon
(74) *Attorney, Agent, or Firm* — Standley Law Group LLP

(57) ABSTRACT

A UV photoactivatable curable paint formation for providing a cured paint coating of a desired appearance on a substrate by UV irradiation, comprises a UV curable film-forming compound; a UV photoinitiator; a particulate UV reflective material in an effective rate of curing enhancing amount without affecting the resultant desired appearance of the cured paint coating.

12 Claims, No Drawings

(56) References Cited

OTHER PUBLICATIONS

Dugan, W.T. et al., Influence of a glutaraldehyde disinfecting solution on curing light effectiveness, General Dentistry, Jan.-Feb. 1989, pp. 40-43.

Fan, P.L. et al., Irradiance of visible light-curing units and voltage variation effects, JADA, Sep. 1987, pp. 442-445, 115.

Felix, C.A. et al., The Effect of Distance from Light Source on Light Intensity from Curing Lights, The Journal of Adhesive Dentistry, 2003, pp. 283-291, 5(3).

Miyazaki, M. et al., Effect of light exposure on fracture toughness and flexural strength of light-cured composites, Dental Materials, Nov. 1996, pp. 328-332, 12.

Suh, B.J. et al., Shrinkage Stress Relaxation using Pulsed Curing, Dental Materials, 1998, pp. 280, 77 (AADR Abstracts).

Price, R.B. et al., Effect of Distance on the Power of Density from Two Light Guides, Journal of Esthetic Dentistry, 2000, pp. 320-327, 12(6).

Meyer, G.R. et al., Decrease in Power Output of New Light-emitting Diode (LED) Curing Devices with Increasing Distance to Filling Surface, The Journal of Adhesive Dentistry, 2002, pp. 197-204, 4(3).

Prati, C. et al., Effect of air, dentin and resin-based composite thickness on light intensity reduction, American Journal of Dentistry, Oct. 1999, pp. 231-234, 12(5).

Moseley, H. et al., An assessment of visible-light polymerizing sources, Journal of Oral Rehabilitation, 1986, pp. 215-224, 13.

Sakaguchi R.L. et al., Curing light performance and polymerization of composite restorative materials, J. Dent., 1992, pp. 183-188, 20(3).

Lu, H. et al., Impact of Curing Protocol on Conversion and Shrinkage Stress, Journal of Dental Research, 2005, pp. 822-826, 84(9).

Scott, B.A. et al., Effect of Disposable Infection Control Barriers on Light Output from Dental Curing Lights, Journal of the Canadian Dental Association, Feb. 2004, pp. 105-110, 70(2).

Usumez, S. et al., Degree of conversion of two lingual retainer adhesives cured with different light sources, European Journal of Orthodontics, 2005, pp. 173-179, 27.

\* cited by examiner

UV PHOTOACTIVATABLE CURABLE PAINT FORMULATIONS AND CURED COATINGS THEREOF

FIELD OF THE INVENTION

This invention relates to UV photoactivable curable paint formulations, process of producing cured coatings therefrom and said cured coatings. It relates particularly to the production of vehicle surfaces coated with said cured formulation by UV radiation.

BACKGROUND TO THE INVENTION

UV photoactivatable curable paint formulations for providing cured paint coatings on a substrate by UV irradiation are known. These prior art formulations comprise UV curable film-forming compounds and a UV photoinitiator to initiate polymeric reaction of the film-forming compounds under the action of the UV radiation.

Such formulations may be pigment-free if a clear coat is desired or contain pigments, dyes and the like if a white, coloured, metallic or other effect appearance is desired. Metallic paints comprising particulate metals are, thus, known wherein the particulate metal is present to provide a desired resultant appearance.

It will be readily understood that it is generally desirable that suitable curing of a curable paint formulation be attained in a reasonable period of time. This is extremely desirable in a commercial environment, such as the surface coating of vehicle bodies and parts thereof on a manufacturing assembly line where the rate of vehicle throughput in a paint shop can have a significant operational cost to the overall manufacturing process.

PCT/EPO5/005517, published Nov. 24, 2006, corresponding to US 2008/0032037A1, published Feb. 7, 2008—Frey, Thomas et al acknowledges that unlike their transparent counterparts, pigmented coating materials per se are difficult to cure by radiation, since the pigments they comprise absorb and reflect the radiation and hence only a small part of the irradiated energy does is actually able effectively to bring about curing. The use of radiation curing for colored and opaque coatings is therefore hindered by the interaction of the pigments used with the radiation, whose intensity is attenuated. Volume curing of the coating particularly at its underside, i.e., down to the substrate, can be reduced as a result of the pigmentation to the point where the coating becomes unusable. Further, aforesaid US 2008/0032037 A1 notes that there has been no lack of attempts to extend radiation curing to pigmented coating materials. Such attempts have involved exposing the coating materials to radiation for a duration empirical data suggested would lead to volume curing.

To address the aforesaid disadvantages, US 2008/0032037 A1 describes a method of allowing, on the one hand, the suitability or non-suitability of radiation curing to be predicted for a specified pigmentation of a coating and, on the other hand, allowing the variables for radiation curing to be determined in such a way that sufficient volume curing can be expected. That object is achieved by a method of determining the conditions for radiation curing radiation-curable pigmented coating materials comprising at least one pigment P, at least one binder B and at least one photoinitiator I on a substrate, comprising the steps of determining, in effect, a plurality of defined parameters.

A promised advantage of the aforesaid method is that the scope of experimental test series can be substantially reduced, the utilization of the exposure units can be optimized, and off-specification batches due to inadequate radiation can be avoided.

There is, however, always the need to enhance the rate of curing of a curable paint formulation irrespective of the nature of the curing process whether it be, for example, a chemical, thermal (baking), or radiation by UV, IR and/or microwave process.

SUMMARY OF THE INVENTION

The invention provides in one aspect a UV photoactivatable curable paint formation for providing a cured paint coating of a desired appearance on a substrate by UV irradiation, said formulation comprising a UV curable film-forming compound; a UV photoinitiator; a particulate UV reflective material in an effective rate of curing enhancing amount without affecting the resultant desired appearance of said cured paint coating.

Most preferably the formulation comprises a pigment.

The particulate UV reflective material is preferably a metal, such as, for example, aluminum or alloy thereof and preferably in the general form of a platelet or sphere.

Preferred formulations comprise 0.1% to 1.0% W/W particulate material and most preferred formulations comprise 0.5% to 0.8% W/W.

In a further aspect, the invention provides a process of producing a cured paint coated substrate comprising (i) coating a substrate with a paint formation as hereinabove defined and (ii) irradiating said formulation with UV radiation to effect curing and produce said cured paint coated substrate.

In some embodiments, the irradiating step may be carried out for about 5 to about 25 seconds, more preferably about 10 to about 20 seconds, though other time periods may also be employed.

In a further aspect, the invention provides a coated substrate having a cured coating produced by UV irradiation of a paint formulation as hereinabove defined.

In a further aspect, the invention provides a coated substrate having a cured coating produced by UV irradiation of a paint formulation when made by a process as hereinabove defined.

The invention is of particular value in the manufacture of painted vehicle surfaces and parts, thereof. In addition to providing enhanced production rates in the painting of vehicles, the invention provides for reduced capital costs of painting equipment.

DETAILED DESCRIPTION OF PREFERRED EMBODIMENTS

In the practice of the invention, a standard basic solvent paint formulation was prepared to which various amounts of particulate aluminum platelets were dispensed.

Table 1 lists the ingredients and amounts thereof wherein the oligomer was an acrylated polyester-urethane (BOMAR SPECIALTIES);

monomer was trimethyl acrylate (Petrochem);

photoinitiator was bis(2,4,6-trimethylbenzoyl)phenyl phosphine oxide (IRGACURE 819®—CIBA/BASF);

aluminum (Algon 500™—Toyal America);

filler was IRGANOX™—IRGANOX;

pigment for (i) the black paint formulation was carbon black, (ii) the white paint formulation was titanium dioxide, and (iii) the silver paint formulation was titanium dioxide and aluminum powder.

dispersant was BYKP—1045 (BYK);
light stabilizer (A) was 50% Tinuvin 400™ (CIBA) and (B) 50% Tinuvin 292 (CIBA); and
solvent was methyl ethyl ketone/methyl isobutyl ketone/butyl acetate/ethyl acetate/xylene in the ratios 20/10/10/15/3.

The aluminum may include flakes, spheres or other shaped particles having particle sizes ranging from any value between 3 to 60 microns, 5 to 40, and 9 to 34, though other material may also be employed.

Coatings of the test formulations were applied to a metal substrate to the film thickness (μ) given in Table 2. UV radiation was applied to the coatings by a FUSION F300™ Focused-Beam Lamp positioned at a distance of 53 mm from the coating surface for a 12 second exposure time.

Table 2 shows the resultant hardness and resin conversion values at the film surface and in the lower body of the film.

Each of the test samples had a solvent resistance (ASTM D5402-06) with double rubs of methyl isobutyl ketone showing, for the white and black samples with no added aluminum some staining, and for all others no staining.

Additional experiments with aluminum amounts of 0.1%, 0.2%, 0.8%, 1.0% and 2.0% W/W showed that the preferred aluminum amounts selected from 0.5 to 0.8% W/W provided significant advantageous curing rate enhancement without effecting undesirable or unwanted appearance changes in the cured painted substrate.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The embodiments of the invention in which an exclusive property or privilege is claimed are defined as follows:

1. A UV photoactivatible curable paint formulation for providing a cured paint coating of a desired appearance on a substrate by UV irradiation, said formulation comprising a UV curable film-forming compound; a UV photoinitiator; and a particulate UV reflective metal in an effective amount to enhance the rate of cure without affecting the resultant desired appearance of said cured paint coating.

2. A paint formulation as claimed in claim 1 comprising a pigment.

3. A paint formulation as claimed in claim 1 wherein said particulate metal is aluminum or an alloy thereof.

4. A paint formulation as claimed in claim 1 wherein said particulate metal is in the general form of a platelet or sphere.

5. A paint formulation as claimed in claim 1 wherein said substrate is a surface of a vehicle or part thereof.

TABLE 1

| Raw Material | BASIC Wt. % | BLACK | | WHITE | | SILVER | |
| --- | --- | --- | --- | --- | --- | --- | --- |
| | | | | (g) | (w/w) | (g) | (w/w) |
| Oligomer | 15-45% | 16.3 | 16.3% | 15.3 | 15.3% | 15.7 | 15.7% |
| Monomer | 25-65% | 53 | 53.0% | 54.79 | 54.8% | 54.59 | 54.6% |
| Photoiniator | 2-10% | 2.9 | 2.9% | 3.25 | 3.3% | 1.95 | 2.0% |
| Added Aluminum | 0-25% | 1.1 | 1.1% | 0.8 | 0.8% | 0 | 0.0% |
| Filler | 0-5% | 1.86 | 1.9% | 1.86 | 1.9% | 5.61 | 5.6% |
| Pigment | 1-10% | 3.25 | 3.3% | 9.45 | 9.5% | 6.3 | 6.3% |
| Dispersant | 0-1% | 0.5 | 0.5% | 0.1 | 0.1% | 0.3 | 0.3% |
| Light Stabilizer (A) | 0.1-1% | 0.47 | 0.5% | 0.47 | 0.5% | 0.47 | 0.5% |
| Light Stabilizer (B) | 1-2% | 1.18 | 1.2% | 1.18 | 1.2% | 1.18 | 1.2% |
| Solvent | 5-30% | 19.44 | 19.4% | 12.8 | 12.8% | 3.9 | 13.9% |
| Total | | | 100 | | 100 | | 100 |

TABLE 2

| | | FILM THICKNESS (μ) | HARDNESS BY PENCIL (ASTM D3363-05) | RESIN CONVERSION | |
| --- | --- | --- | --- | --- | --- |
| | | | | Surface | Through |
| WHITE | NO Added Aluminum | 25 | H | 66% | 50% |
| | | 50 | H | 55% | 48% |
| | With Added Aluminum | 25 | 2H | 88% | 75% |
| | | 50 | 2H | 81% | 73% |
| BLACK | NO Added Aluminum | 25 | H | 68% | 57% |
| | | 50 | H | 65% | 54% |
| | With Added Aluminum | 25 | 2H | 87% | 82% |
| | | 50 | 2H | 85% | 80% |
| SILVER | NO Added Aluminum | 25 | 2H | 98% | 97% |
| | | 50 | 2H | 98% | 98% |

6. A paint formulation as claimed in claim 1 comprising 0.1% to 1.0% W/W UV reflective particulate metal.

7. A paint formulation as claimed in claim 6 comprising 0.5% to 0.8% W/W UV reflective particulate metal.

8. A process of producing a cured paint coated substrate comprising (i) coating a substrate with a paint formulation as defined in claim 1 and (ii) irradiating said formulation with UV radiation to effect curing and produce said cured paint coated substrate.

9. A process as defined in claim 8, wherein the irradiating step occurs for about 5 to about 25 seconds.

10. A process as defined in claim 9, wherein the irradiating step occurs for about 10 to about 20 seconds.

11. A coated substrate having a cured coating produced by UV irradiation of a paint formulation as defined in claim 1.

12. A coated substrate having a cured coating produced by UV irradiation of a paint formulation when made by the process as defined in claim 8.

* * * * *